(12) United States Patent
Tomono

(10) Patent No.: US 12,352,769 B2
(45) Date of Patent: Jul. 8, 2025

(54) METHOD, SYSTEM, AND DEVICE FOR DESIGNING EXPERIMENTAL PROTOCOL

(71) Applicant: Shimadzu Corporation, Kyoto (JP)

(72) Inventor: Taichi Tomono, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 12 days.

(21) Appl. No.: 18/013,411

(22) PCT Filed: Mar. 9, 2021

(86) PCT No.: PCT/JP2021/009166
§ 371 (c)(1),
(2) Date: Dec. 28, 2022

(87) PCT Pub. No.: WO2022/004061
PCT Pub. Date: Jan. 6, 2022

(65) Prior Publication Data
US 2023/0251832 A1    Aug. 10, 2023

(30) Foreign Application Priority Data

Jun. 30, 2020 (JP) .................................. 2020-112661

(51) Int. Cl.
*G06F 8/34* (2018.01)
*G01N 35/00* (2006.01)
(Continued)

(52) U.S. Cl.
CPC ......... *G01N 35/00* (2013.01); *G06F 3/04842* (2013.01); *G06F 8/24* (2013.01);
(Continued)

(58) Field of Classification Search
CPC ............ G06F 9/5038; G06F 8/24; G06F 8/34; G06F 3/04842; G06F 16/24568;
(Continued)

(56) References Cited

U.S. PATENT DOCUMENTS 6,594,588 B1    7/2003  Peden et al.
7,337,440 B1 *  2/2008  Schmidt .................... G06F 8/24
                                                            717/121

(Continued)

FOREIGN PATENT DOCUMENTS

| JP | 2010-518488 A | 5/2010 |
| WO | 2008/014724 A1 | 2/2008 |
| WO | 2008/097793 A1 | 8/2008 |
| WO | 2016/208623 A1 | 12/2016 |

OTHER PUBLICATIONS

Office Action dated Jan. 9, 2024 for corresponding Japanese patent application No. JP 2022-533680.

(Continued)

*Primary Examiner* — Tuan A Vu
(74) *Attorney, Agent, or Firm* — Muir Patent Law, PLLC

(57) ABSTRACT

A method for designing an experimental protocol capable of coping with more advanced processing is provided. A system according to an aspect includes at least one experimental device, a controller, and a terminal device. The controller controls the at least one experimental device to execute an experimental protocol defining processing order of the at least one experimental device. The terminal device designs the experimental protocol in a form of an oriented graph in accordance with a GUI operation performed on a specific application by a user. A plurality of nodes are selectable in the terminal device as a vertex of the oriented graph and the plurality of nodes include a processing node corresponding to processing by each of the at least one experimental device and a conditional branch node corresponding to conditional branch processing.

10 Claims, 20 Drawing Sheets

(51) Int. Cl.
*G06F 3/04842* (2022.01)
*G06F 8/20* (2018.01)
*G06F 16/903* (2019.01)
*H04L 67/50* (2022.01)
*G06F 9/50* (2006.01)
*G06F 16/2455* (2019.01)
*H04L 41/0869* (2022.01)

(52) U.S. Cl.
CPC .......... *G06F 8/34* (2013.01); *G06F 16/90344* (2019.01); *H04L 67/535* (2022.05); *G06F 9/5038* (2013.01); *G06F 16/24568* (2019.01); *H04L 41/0869* (2013.01)

(58) Field of Classification Search
CPC .............. G06F 16/90344; G06N 20/00; H04L 41/0869; H04L 67/535; G01N 35/00
See application file for complete search history.

(56) References Cited

U.S. PATENT DOCUMENTS

| | | | | |
|---|---|---|---|---|
| 10,873,592 | B1* | 12/2020 | Singh | .................... H04L 67/535 |
| 11,303,651 | B1* | 4/2022 | Mouleeswaran | ............................ G06F 16/24568 |
| 2010/0211953 | A1* | 8/2010 | Wakeling | .............. G06F 9/5038 714/48 |
| 2018/0253194 | A1 | 9/2018 | Javadi | |
| 2019/0312800 | A1* | 10/2019 | Schibler | .............. H04L 41/0869 |
| 2019/0354400 | A1* | 11/2019 | Geigel | ................... G06N 20/00 |
| 2020/0210479 | A1* | 7/2020 | Bequet | .............. G06F 16/90344 |

OTHER PUBLICATIONS

PCT Written Opinion of the International Searching Authority (Form PCT/ISA/237) for PCT application PCT/JP2021/009166, dated May 18, 2021.

* cited by examiner

400

METHOD, SYSTEM, AND DEVICE FOR DESIGNING EXPERIMENTAL PROTOCOL

TECHNICAL FIELD

The present invention relates to a method, a system, and a device for designing an experimental protocol.

BACKGROUND ART

Conventionally, a configuration in which a user performs an experiment according to an experimental protocol designed on a computer is known. For example, a system disclosed in WO 2016/208623 (PTL 1) acquires and displays a graph in which a chain of experiments is formed in a mesh shape from a database including information about the experimental protocol.

CITATION LIST

Patent Literature

PTL 1: WO 2016/208623

SUMMARY OF INVENTION

Technical Problem

In the system disclosed in PTL 1, it is possible to grasp a relation between a plurality of experiments associated with each of a plurality of experimental protocols based on a hierarchical structure of the experimental protocol defined by an inheritance relation between a certain experimental protocol and another experimental protocol in which a part of the experimental protocol is modified. However, in the system disclosed in PTL 1, a plurality of processing flows included in one protocol are not considered, and more advanced processing cannot be supported.

The present invention has been made to solve such a problem, and an object of the present invention is to accurately perform automatic analysis of the experimental protocol.

Solution to Problem

A method according to an aspect of the present invention includes: receiving, from a user, a graphical user interface (GUI) operation to a specific application; designing an experimental protocol in a form of an oriented graph in accordance with the received GUI operation, the experimental protocol defining processing order of at least one experimental device; and controlling the at least one experimental device to automatically execute the experimental protocol. A plurality of nodes are selectable as a vertex of the oriented graph and the plurality of nodes include a processing node corresponding to processing by each of the at least one experimental device and a conditional branch node corresponding to conditional branch processing.

A system according to another aspect of the present invention includes at least one experimental device, a terminal device, and a controller. The terminal device includes an input unit and a processing unit. The input unit receives, from a user, a GUI operation to the specific application. The processing unit designs an experimental protocol in a form of an oriented graph in accordance with the received GUI operation. The experimental protocol defines processing order of the at least one experimental device. The controller controls the at least one experimental device to execute the experimental protocol. A plurality of nodes are selectable in the terminal device as a vertex of the oriented graph and the plurality of nodes include a processing node corresponding to processing by each of the at least one experimental device and a conditional branch node corresponding to conditional branch processing.

A device still according to another aspect of the present invention controls at least one experimental device to execute an experimental protocol defining processing order of the at least one experimental device. The device includes a display unit, an input unit, and a processing unit. A specific application is displayed on the display unit. The input unit receives, from a user, a GUI operation to the specific application. The processing unit designs the experimental protocol in a form of an oriented graph in accordance with the GUI operation. A plurality of nodes are selectable as a vertex of the oriented graph and the plurality of nodes include a processing node corresponding to processing by each of the at least one experimental device and a conditional branch node corresponding to conditional branch processing.

Advantageous Effects of Invention

According to the method, the system, and the device of the present invention, the experimental protocol can be designed in the form of the oriented graph including the conditional branch node, so that the method for designing the experimental protocol capable of coping with more advanced processing can be provided.

DESCRIPTION OF EMBODIMENT

Figure 1:
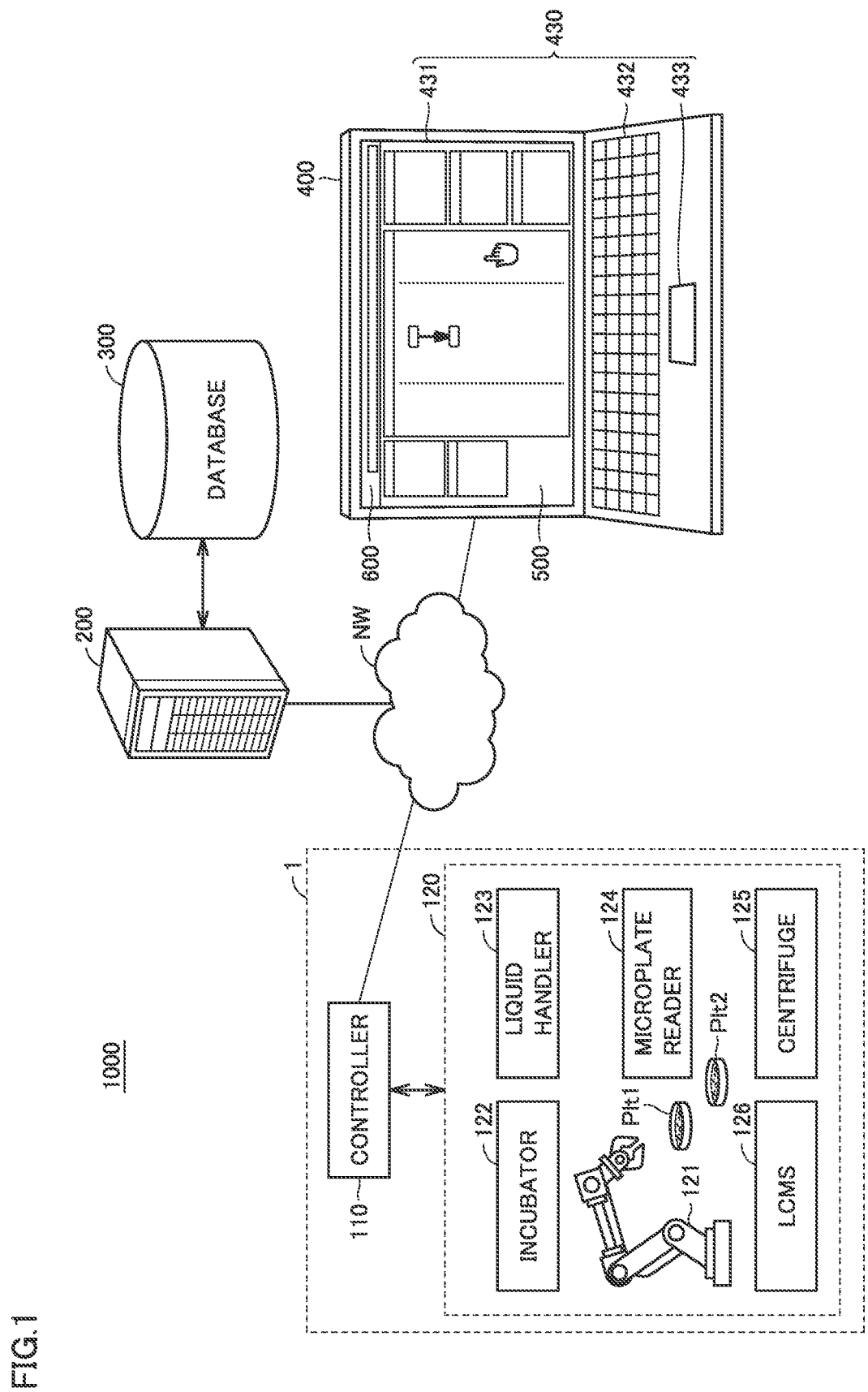
FIG. 1 is a block diagram illustrating a configuration of an automatic experiment management system according to an embodiment.

Hereinafter, an embodiment will be described in detail with reference to the drawings. In the drawings, the same or corresponding portions are denoted by the same reference numeral, and the description will not be repeated in principle.

FIG. 1 is a block diagram illustrating a configuration of an automatic experiment management system 1000 according to an embodiment. As illustrated in FIG. 1, automatic experiment management system 1000 includes an automatic experiment system 1, a server device 200, a database 300, and a terminal device 400. Database 300 is connected to server device 200. For example, information about automatic experiment system 1, information about a sample, an experiment protocol, and output data (experiment result) by execution of the experiment protocol are registered in database 300. Terminal device 400 includes an input and output unit 430. Input and output unit 430 includes a display 431, a keyboard 432, and a touch pad 433. For example, terminal device 400 is a notebook computer, a personal computer, a smartphone, and a tablet. Automatic experiment system 1, server device 200, and terminal device 400 are connected to each other through a network NW. For example, network NW includes the Internet, a wide area network (WAN), or a local area network (LAN). The number of terminal devices connected to the network NW may greater than or equal to two, and the number of automatic experiment systems may be greater than or equal to.

Server device 200 provides an experimental protocol design application 500 (specific application) as a web application to terminal device 400. Experimental protocol design application 500 is displayed on display 431 through a Web browser 600 in terminal device 400. Keyboard 432 and touch pad 433 receive a GUI operation on experimental protocol design application 500 by a user. That is, the user of terminal device 400 selects the automatic experiment system in experimental protocol design application 500 by the GUI operation through keyboard 432 and touch pad 433, and designs the experimental protocol executed by the automatic experiment system. The experimental protocol defines processing order of at least one experimental device included in the automatic experiment system selected by the user. Terminal device 400 transmits the experimental protocol designed by the user to server device 200. Server device 200 transmits the experimental protocol to the automatic experiment system designated by the user of terminal device 400. Server device 200 can collectively manage a plurality of terminal devices and a plurality of automatic experiment systems when being interposed between the terminal device that designs the experimental protocol and the automatic experiment system that executes the experimental protocol.

Automatic experiment system 1 includes a controller 110 and a plurality of experimental devices 120. Controller 110 controls the plurality of experimental devices 120 to automatically execute the experimental protocol from server device 200. The plurality of experimental devices 120 include a robot arm 121, an incubator 122, a liquid handler 123, a microplate reader 124, a centrifuge 125, and a liquid chromatograph mass spectrometer (LCMS) 126. The number of experimental devices included in the automatic experiment system may be one.

Robot arm 121 moves a plate Plt1 or Plt2, which is a container containing a sample, to the experimental device corresponding to each of a plurality of pieces of processing according to the order of the plurality of pieces of processing defined in the experimental protocol. For example, each of plates Plt1, Plt2 contains agar containing a cultured *Escherichia coli*. Incubator 122 cultures a cell while performing temperature control. Liquid handler 123 automatically distributes (dispenses) a certain amount of sample into each of a plurality of microplates (wells). Microplate reader 124 performs measurements (for example, absorbance measurement and fluorescence intensity measurement) of an optical property of the sample in the microplate. Centrifuge 125 separates components of the sample by centrifugal force. LCMS 126 performs mass spectrometry separating components of the sample separated by liquid chromatograph for each mass-to-charge ratio (m/z).

Figure 2:
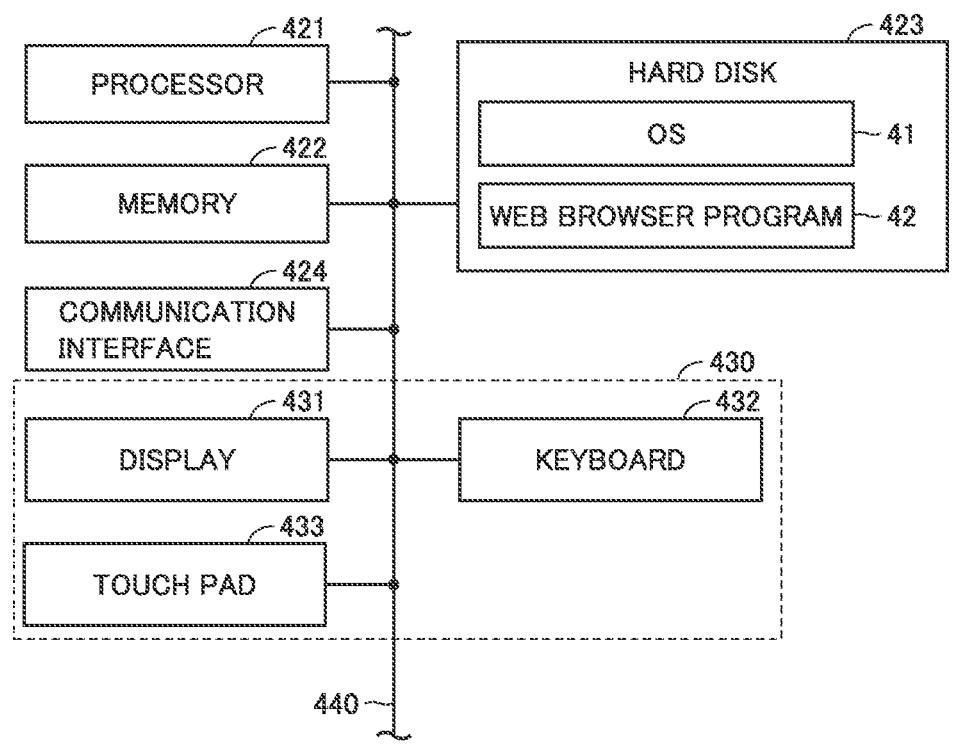
FIG. 2 is a block diagram illustrating a hardware configuration of a terminal device in FIG. 1.

FIG. 2 is a block diagram illustrating a hardware configuration of terminal device 400 in FIG. 1. As illustrated in FIG. 2, terminal device 400 includes a processor 421, a memory 422 and a hard disk 423 as a storage, a communication interface 424, and input and output unit 430. These are communicably connected to each other through a bus 440.

Hard disk 423 is a non-volatile storage device. For example, hard disk 423 stores a program 41 of an operating system (OS) and a Web browser program 42. In addition to the data in FIG. 2, for example, settings and outputs of various applications are stored in hard disk 423. Memory 422 is typically a volatile storage device such as a dynamic random access memory (DRAM).

Processor 421 includes a central processing unit (CPU). Processor 421 reads a program stored in hard disk 423 into memory 422 and executes the program. Processor 421 is connected to network NW through communication interface 424.

Figure 3:
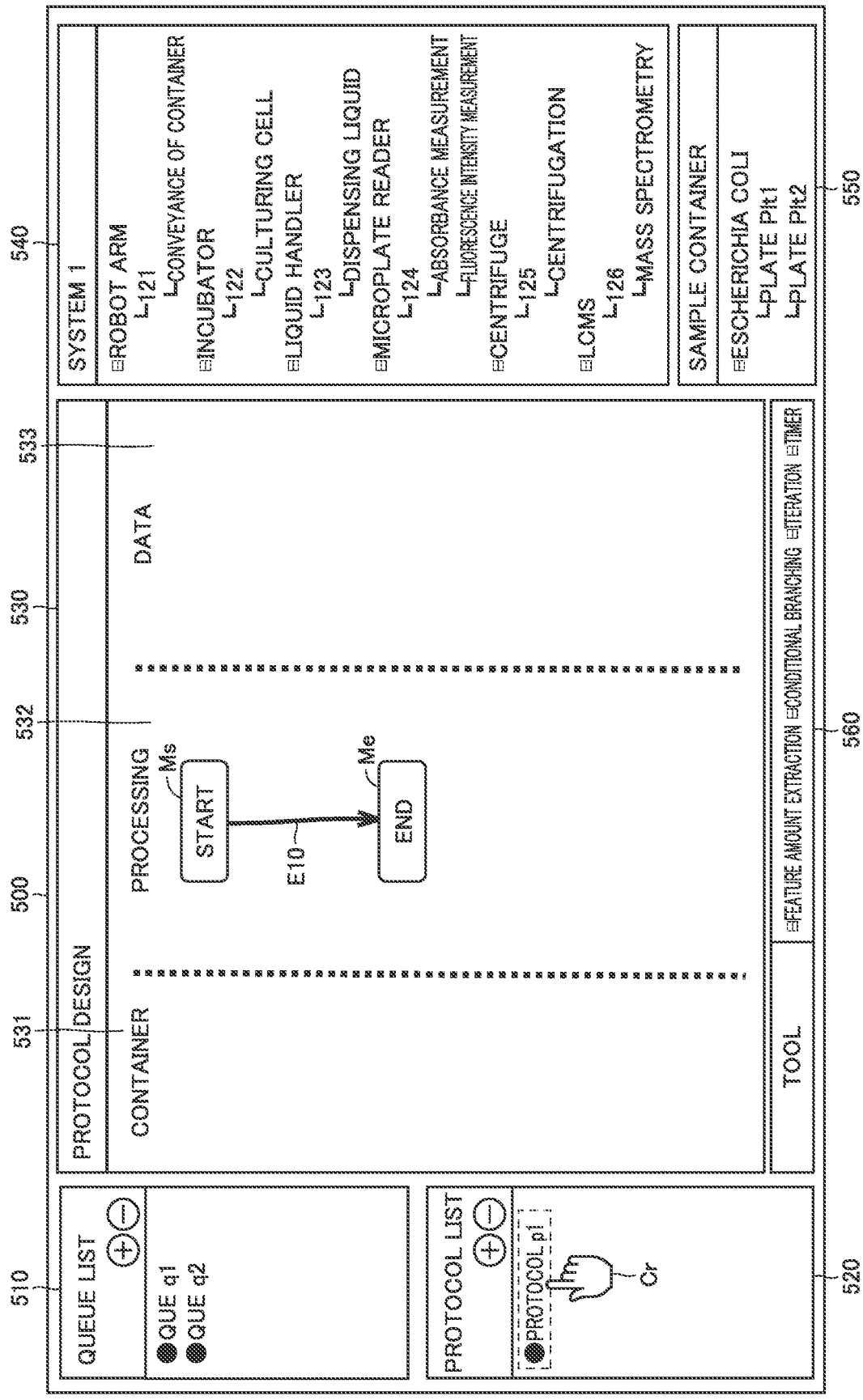
FIG. 3 is a view illustrating a GUI configuration of an experimental protocol design application in FIG. 1.

FIG. 3 is a view illustrating a GUI configuration of experimental protocol design application 500 in FIG. 1. As illustrated in FIG. 3, experimental protocol design application 500 includes a queue list window 510, a protocol list window 520, a protocol design window 530, an automated experiment system window 540, a sample container window 550, a tool window 560, and a selection cursor Cr.

Queue list window 510 displays a queue in which a plurality of protocols are ordered. In FIG. 3, queues q1, q2 are displayed in queue list window 510. The experimental protocol is displayed in protocol list window 520. In FIG. 3, an experimental protocol p1 is displayed and selected in protocol list window 520.

In protocol design window 530, the experimental protocol is designed in a form of an oriented graph. In the oriented graph, a connection relationship between a plurality of nodes is defined as an edge. The oriented graph is stored as graph structure data according to a predetermined structured data format. For example, eXtensible Markup Language (XML) and JavaScript (registered trademark) Object Notation (Json) can be cited as the structured data format. The plurality of nodes selectable as vertices of the oriented graph are formed as GUIs and include container nodes, processing nodes, and data nodes. The container node is a node corresponding to a container containing the sample. The processing node is a node corresponding to processing by each of the device included in the automatic experiment system. The data node is a node corresponding to the output data of the processing of the experimental device.

The protocol design window 530 is divided into a container region 531, a processing region 532, and a data region 533. In an initial state in which design of a certain experimental protocol is started, a start node Ms representing a start of the experimental protocol, an end node Me representing an end of the experimental protocol, and an edge E10 from the start node Ms to the end node Me are displayed in processing region 532.

Processing executable by each of at least one experimental device included in the automatic experiment system selected by the user is displayed in automatic experiment system window 540. In FIG. 3, automatic experiment system 1 is selected. "Transport of container" is displayed as the processing executable by robot arm 121. "Cell culture" is displayed as the processing executable by incubator 122. "Dispensing of liquid" is displayed as the processing executable by liquid handler 123. "Absorbance measurement" and "fluorescence intensity measurement" are displayed as the processing executable by microplate reader 124. "Centrifugation" is displayed as the processing executable by centrifuge 125. "Mass spectrometry" is displayed as the processing executable by LCMS 126.

The container containing the sample is displayed in sample container window 550. In FIG. 3, plates Plt1, Plt2 are displayed as the container storing the *Escherichia coli* that is an example of the sample.

Specific processing performed by the controller of the automatic experiment system is displayed on tool window 560. In FIG. 3, "feature amount extraction", "conditional branching", "iteration", and "timer" are displayed. The "feature amount extraction" corresponds to processing for extracting a feature amount designated by the user from the data corresponding to the data node selected by the user. The "conditional branching" corresponds to processing for performing branching processing based on whether a condition designated by the user is successful. The "iteration" corresponds to processing for iterating specified processing a number of times designated by the user. The "timer" corresponds to processing for waiting for the progressing of the experimental protocol for a time designated by the user.

Figure 4:
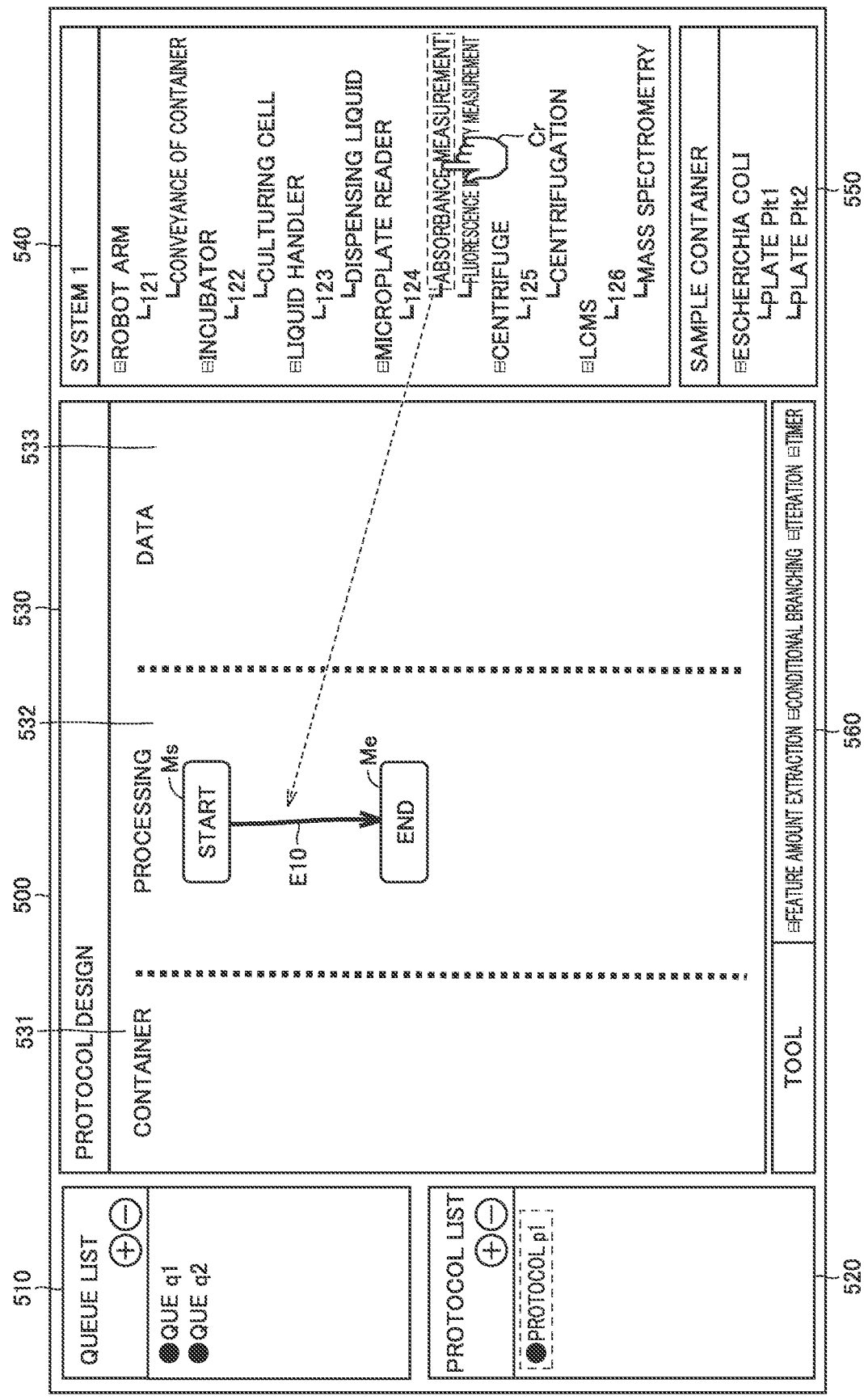
FIG. 4 is a view illustrating a state in which certain processing is selected in the automatic experiment system window of FIG. 3.

FIG. 4 is a view illustrating a state in which certain processing is selected in automatic experiment system window 540 of FIG. 3. As illustrated in FIG. 4, the "absorbance measurement" is selected by the user in automated experiment system window 540 and dragged between start node Ms and end node Me.

Figure 5:
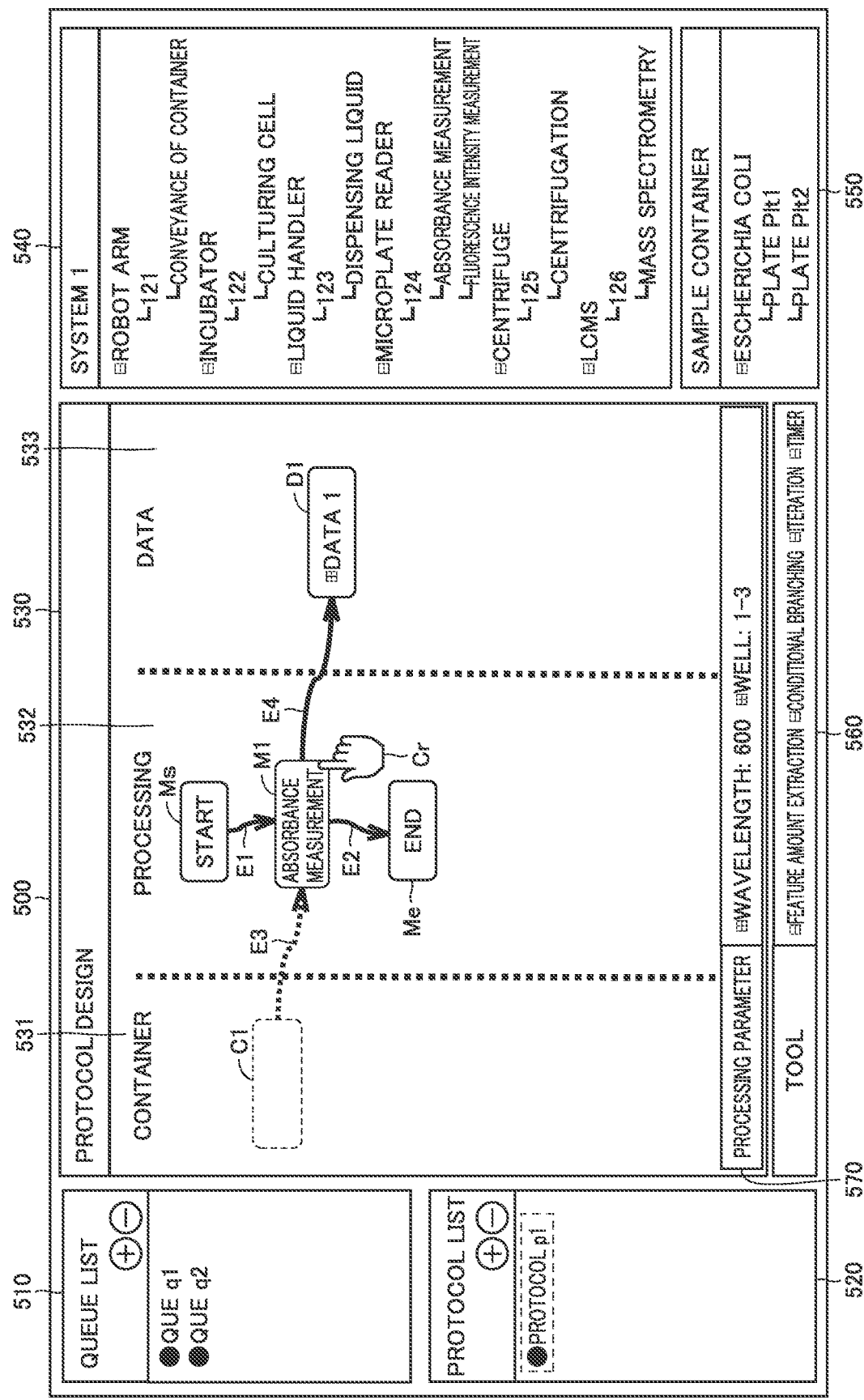
FIG. 5 is a view illustrating a state in which a processing node corresponding to processing selected in FIG. 4 is added to a protocol design window.

FIG. 5 is a diagram illustrating a state in which the processing node corresponding to the processing selected in FIG. 4 is added to protocol design window 530. As illustrated in FIG. 5, a processing node M1 corresponding to the "absorbance measurement" is added and selected between start node Ms and end node Me. Due to the addition of processing node M1, a container node C1 and a data node D1 are automatically added to container region 531 and data region 533, respectively. An information window 570 including information about the selected node is displayed due to the selection of processing node M1. In FIG. 5, a measurement wavelength and a measurement target well are displayed as parameters of the absorbance measurement corresponding to processing node M1.

Start node Ms and processing node M1 are connected by an edge E1 from start node Ms to processing node M1. Processing node M1 and end node Me are connected by an edge E2 from processing node M1 to end node Me. Container node C1 and processing node M1 are connected by an edge E3 (first edge) from container node C1 to processing node M1. Processing node M1 and data node D1 are connected by an edge E4 (second edge) from processing node M1 to data node D1. Edge E3 indicates that the container corresponding to container node C1 is input to the processing corresponding to processing node M1. Edge E4 indicates that the output data of the processing corresponding to processing node M1 corresponds to data node D1. Due to the addition of the processing node, the container node and the data node that are connected to the processing node are automatically added, whereby the design of the experimental protocol can be made efficient. In FIG. 5, because the sample container corresponding to container node C1 is not designated, container node C1 and edge E3 are indicated by dotted lines.

Figure 6:
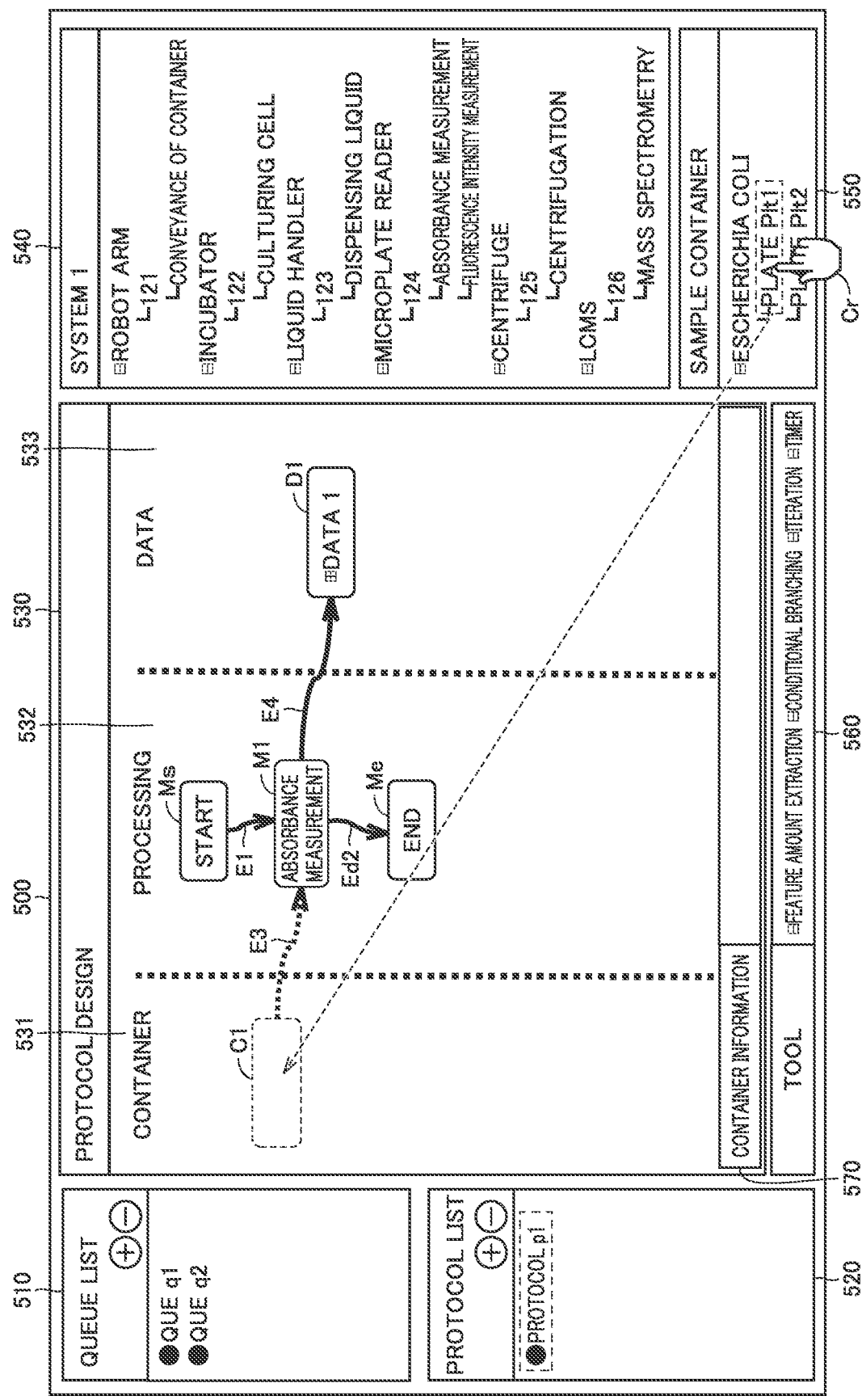
FIG. 6 is a view illustrating a state in which a sample container corresponding to a container node in FIG. 5 is designated.

FIG. 6 is a view illustrating a state in which the sample container corresponding to container node C1 in FIG. 5 is designated. As illustrated in FIG. 6, "plate Plt1" is selected in sample container window 550 and dragged into vessel node C1 by the user. Due to "plate Plt1" is selected in sample container window 550, a title of information window 570 changes to "container information".

Figure 7:
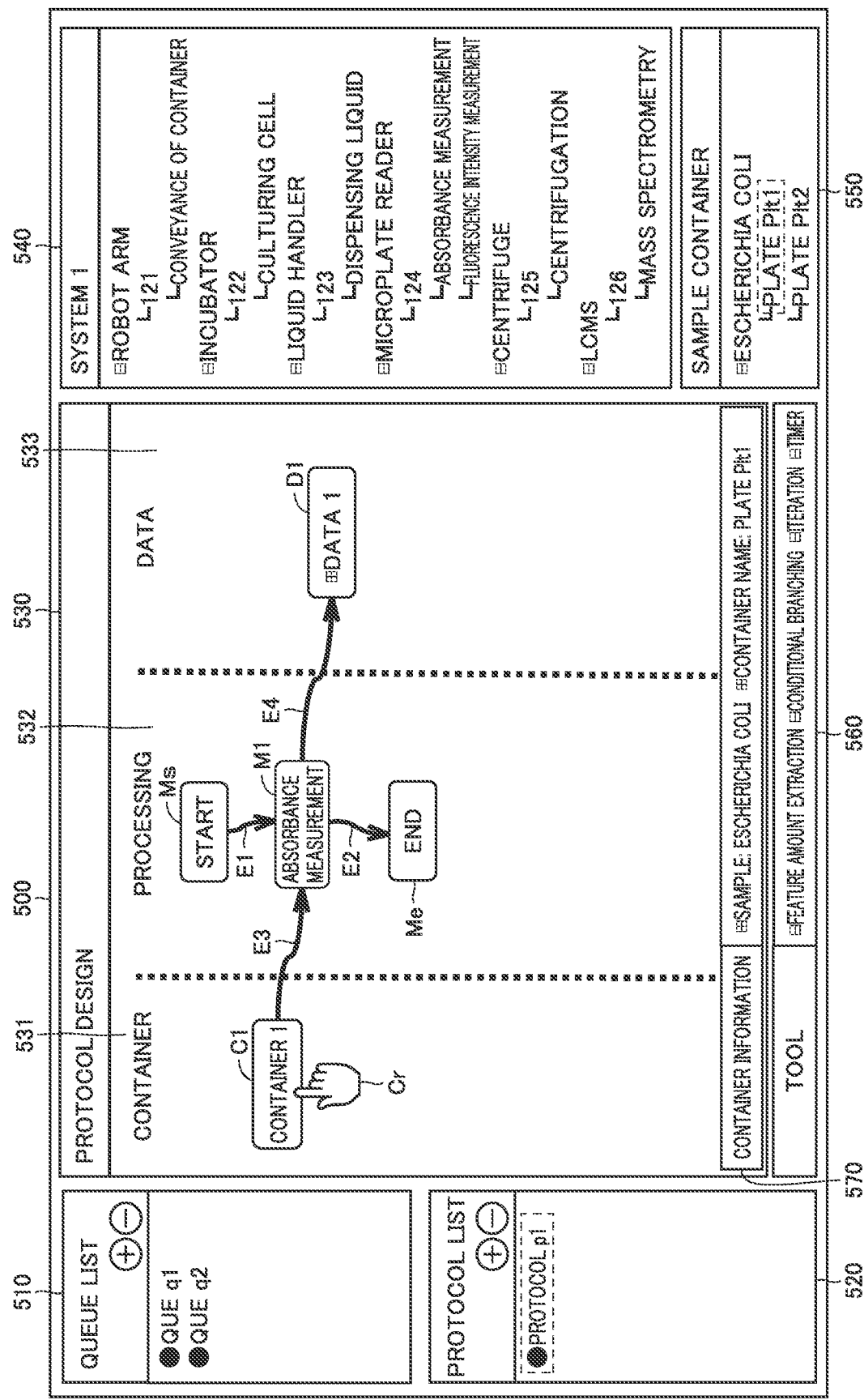
FIG. 7 is a view illustrating a state in which the designation of the sample container corresponding to the container node in FIG. 6 is completed.

FIG. 7 is a view illustrating a state in which the designation of the sample container corresponding to container node C1 in FIG. 6 is completed. As illustrated in FIG. 7, container node C1 is selected, and container node C1 and edge E3 are indicated in solid lines. The sample and a container name contained in the container corresponding to container node C1 are illustrated in information window 570.

Figure 8:
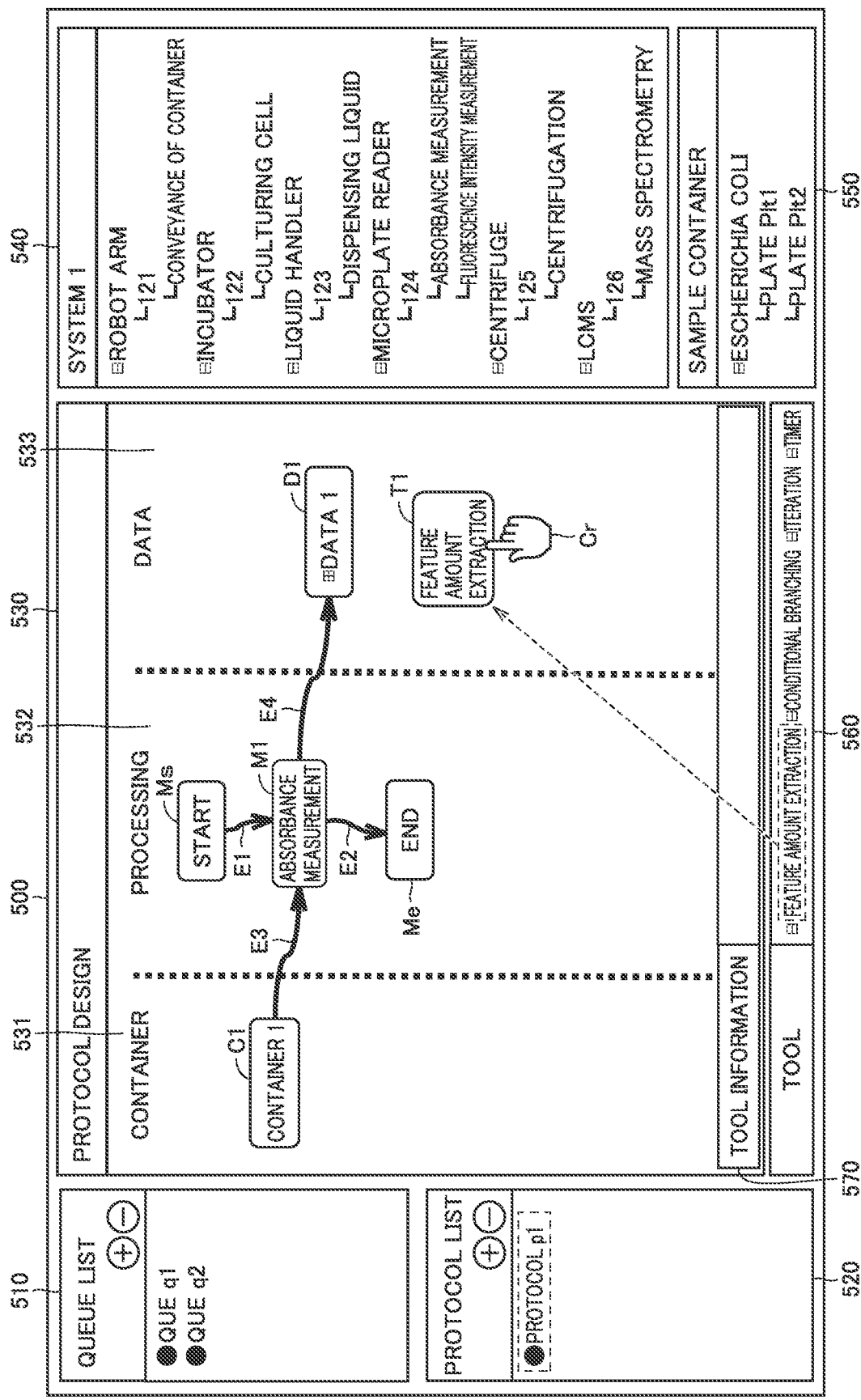
FIG. 8 is a view illustrating a state in which a feature amount extraction node is added to the protocol design window in FIG. 7.

FIG. 8 is a view illustrating a state in which a feature amount extraction node T1 is added to protocol design window 530 in FIG. 7. The "feature quantity extraction" is selected in tool window 560 and dragged into protocol design window 530. As a result, feature amount extraction node T1 is added to protocol design window 530. The title of information window 570 changes to "tool information" due to the selection of feature amount extraction node T1.

Figure 9:
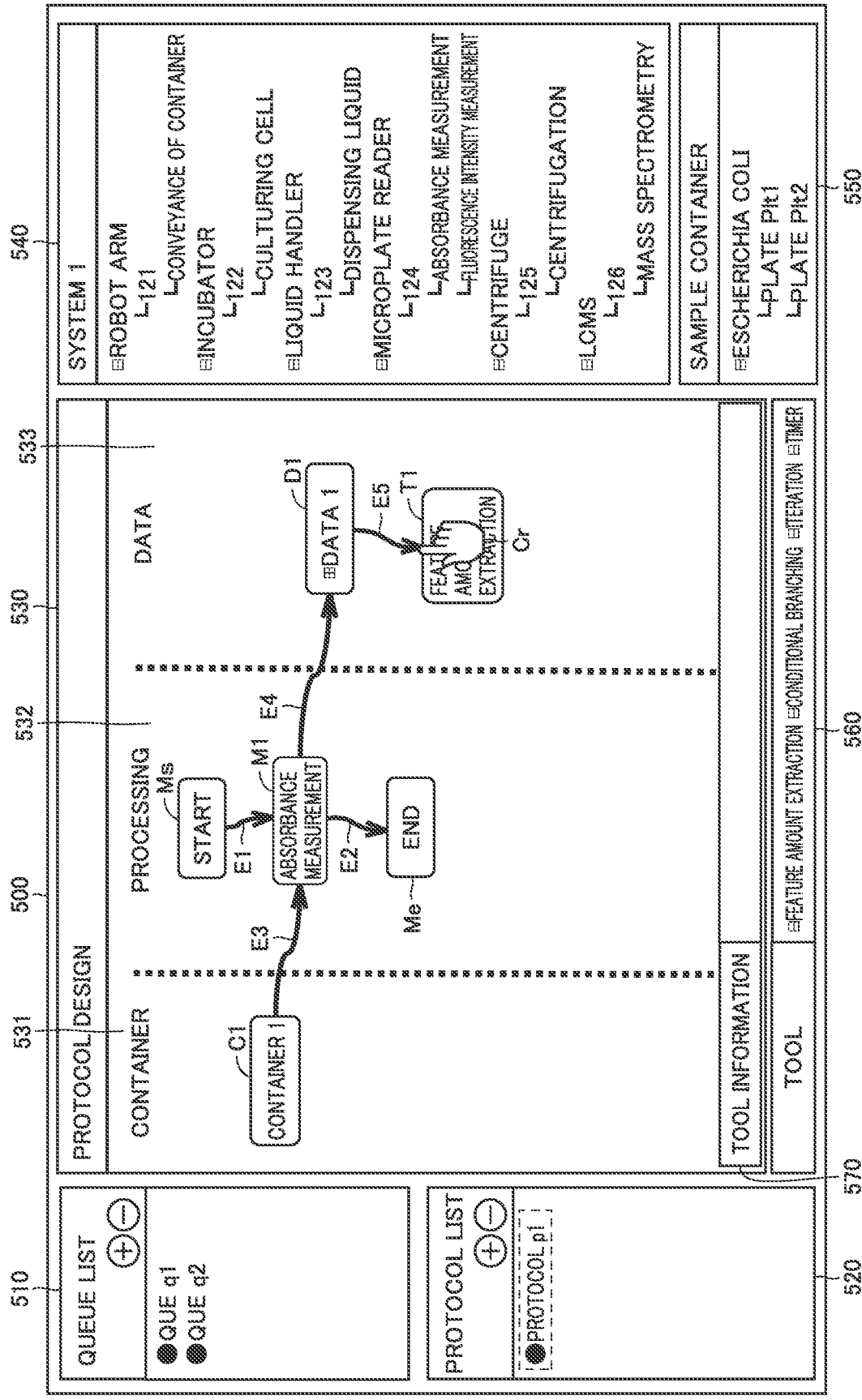
FIG. 9 is a view illustrating a state in which output data corresponding to the data node in FIG. 8 is selected as data for which characteristic amount extraction processing corresponding to the characteristic amount extraction node is performed.

FIG. 9 is a view illustrating a state in which output data corresponding to data node D1 in FIG. 8 is selected as the data for which characteristic amount extraction processing corresponding to characteristic amount extraction node T1 is performed. As illustrated in FIG. 9, an edge E5 from data node D1 to feature amount extraction node T1 is added by a drag operation of the user from data node D1 to feature amount extraction node T1. Edge E5 indicates that a certain feature amount is extracted from the output data corresponding to data node D1 by the feature amount extraction processing corresponding to feature amount extraction node T1. The user can designate the feature amount extracted from the output data corresponding to data node D1 in the information window corresponding to feature amount extraction node T1. The feature amount may be selected from a predetermined feature amount template.

Figure 10:
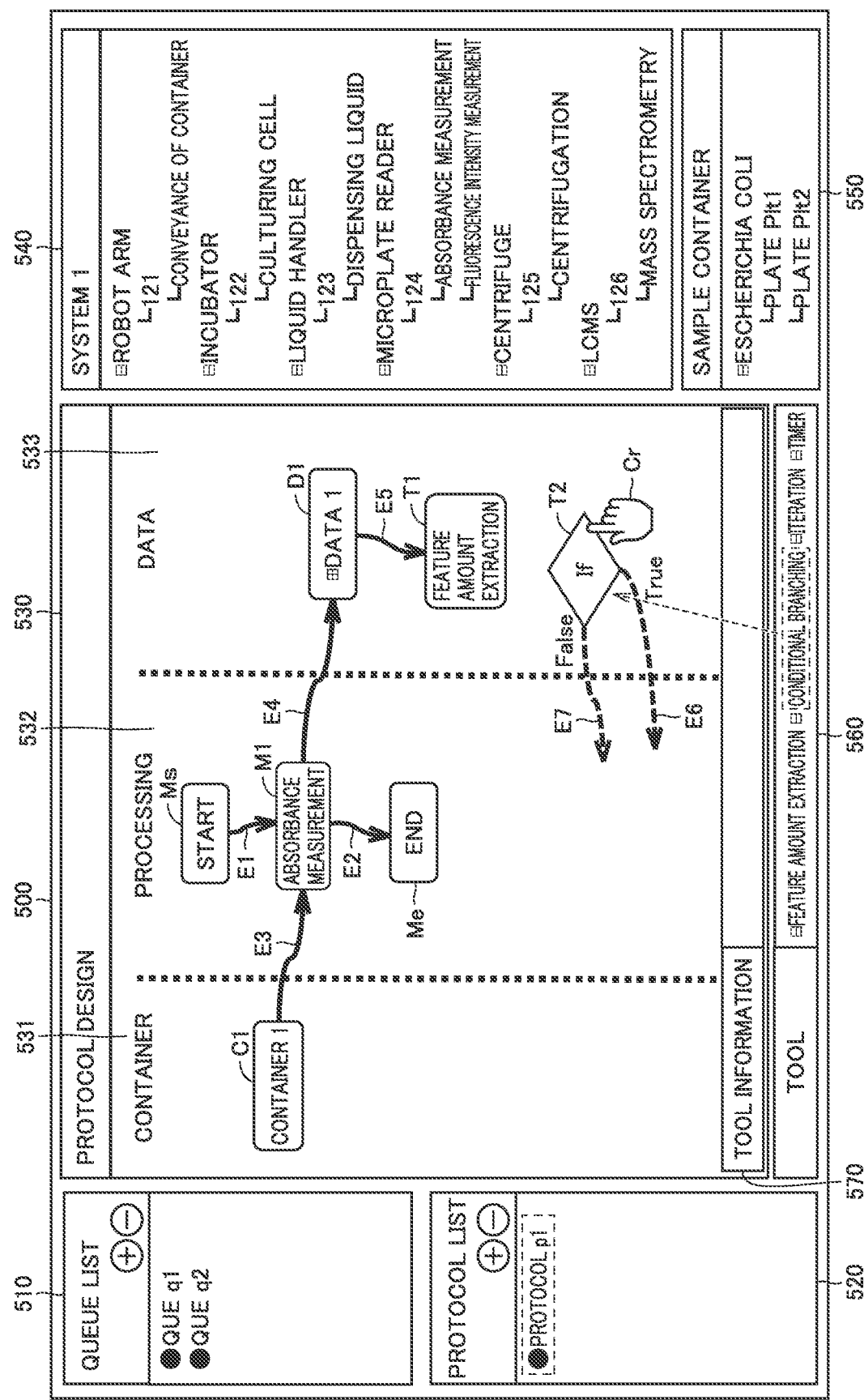
FIG. 10 is a view illustrating a state in which a conditional branch node is added to the protocol design window in FIG. 9.

FIG. 10 is a view illustrating a state in which a conditional branch node T2 is added to protocol design window 530 in FIG. 9. As illustrated in FIG. 10, the "conditional branching" is selected in tool window 560 and dragged into protocol design window 530. As a result, conditional branch node T2 is added to protocol design window 530. The user may specify a condition for condition branch node T2 in information window 570. For example, the condition can be input as an equality or an inequality. An edge E6 indicating that the condition of conditional branch node T2 is satisfied and an edge E7 indicating that the condition is not satisfied extend from conditional branch node T2. Each of edges E6, E7 is indicated by a dotted line because a connection destination is undetermined.

Figure 11:
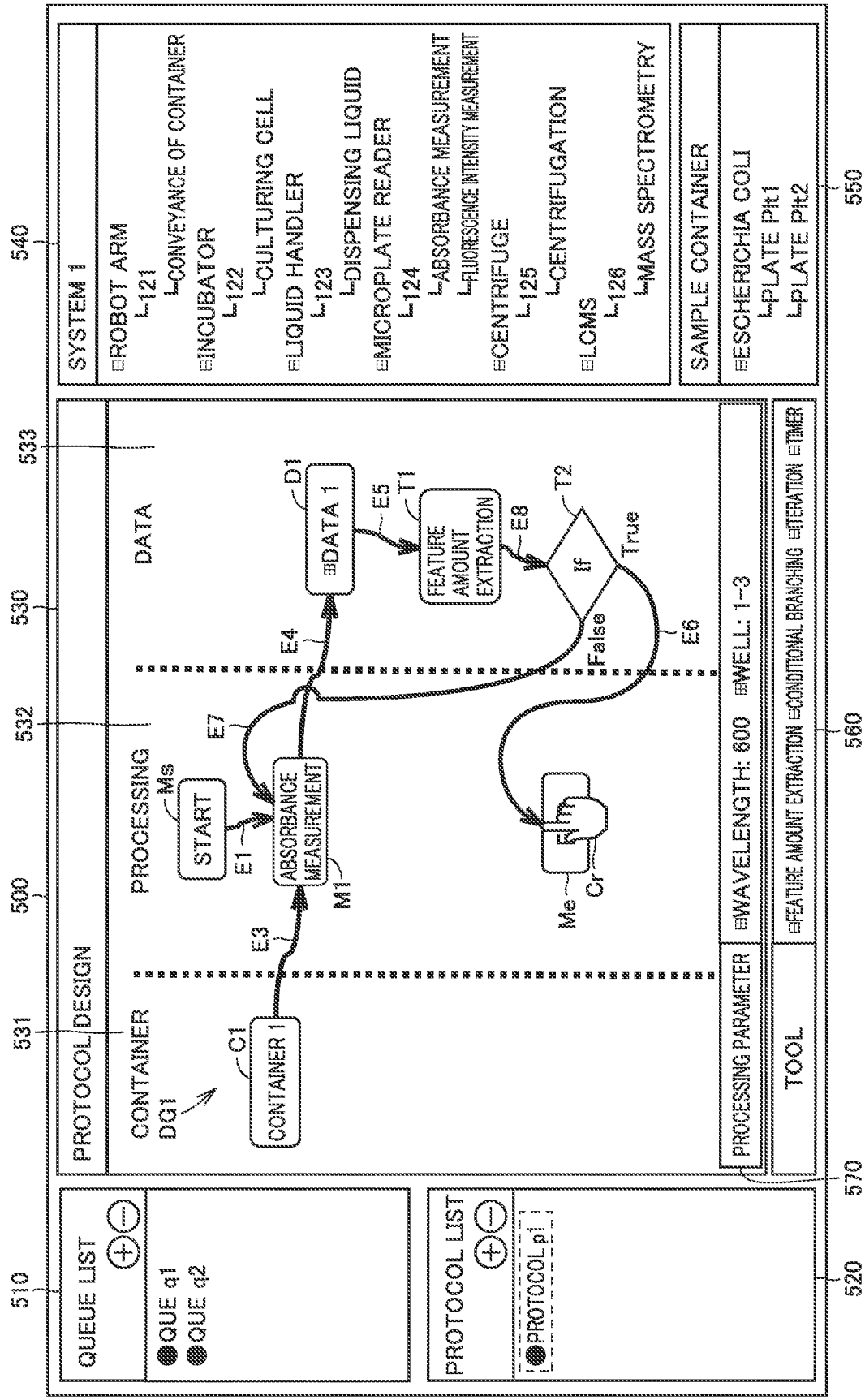
FIG. 11 is a view illustrating a state in which conditional branch processing of the conditional branch node in FIG. 10 is established.

FIG. 11 is a view illustrating a state in which the conditional branch processing of conditional branch node T2 in FIG. 10 is established. In an oriented graph DG1 of FIG. 11, the position of end node Me is moved from the position of end node Me in FIG. 10, and edge E2 is deleted. An edge E8 from feature amount extraction node T1 to conditional branch node T2 is added by the drag operation of the user from feature amount extraction node T1 to conditional branch node T2. Edge E8 indicates that a condition related to the feature amount extracted by the processing corresponding to feature amount extraction node T1 is designated as the condition of conditional branch node T2. A distal end of edge E6 is connected to end node Me by the drag operation of the user on the distal end of edge E6. The distal end of edge E7 is connected to processing node M1 by the drag operation of the user on the distal end of edge E7. The feature amount of the output data corresponding to data node D1 can be directly used as the condition of conditional branch node T2 through feature amount extraction node T1, so that the design of the conditional branch processing based on the output data can be made efficient.

Oriented graph DG1 includes a loop structure that circulates through processing node M1, data node D1, feature amount extraction node T1, and conditional branch node T2 in this order. When the condition of condition branch node T2 is satisfied, experimental protocol p1 ends. When the condition of condition branch node T2 is not satisfied, the processing of each of processing node M1 and feature amount extraction node T1 is performed in this order, and then the conditional branch processing of conditional branch node T2 is performed again. While the condition of the condition branch node T2 is not satisfied, the processing of each of processing node M1 and feature amount extraction node T1 is repeated. That is, the condition of conditional branch node T2 is an end condition of the iterative processing including the processing of each of processing node M1 and feature amount extraction node T1. The condition of the conditional branch node can also be a continuation condition of the iterative processing. In this case, the iterative processing is continued while the condition of the conditional branch node is satisfied.

The conditional branch processing node is included in the plurality of nodes selectable as a vertex of the oriented graph, so that the structure of the conditional branch processing and the structure of the iterative processing of the experimental protocol can be accurately reflected in the oriented graph. As a result, the method for designing the experimental protocol capable of coping with more advanced processing can be provided. In addition, the experimental protocol is designed in the form of the oriented graph, so that the automatic analysis of the experimental protocol, such as tracking of the process of change of the sample in the experimental protocol, can be accurately performed. For example, a lineage of cells formed by repeating seeding and subculture can be cited as the process of changing the sample in the experimental protocol. The automatic analysis of the experimental protocol also includes machine learning (for example, principal component analysis or deep learning) on the oriented graph.

Figure 12:
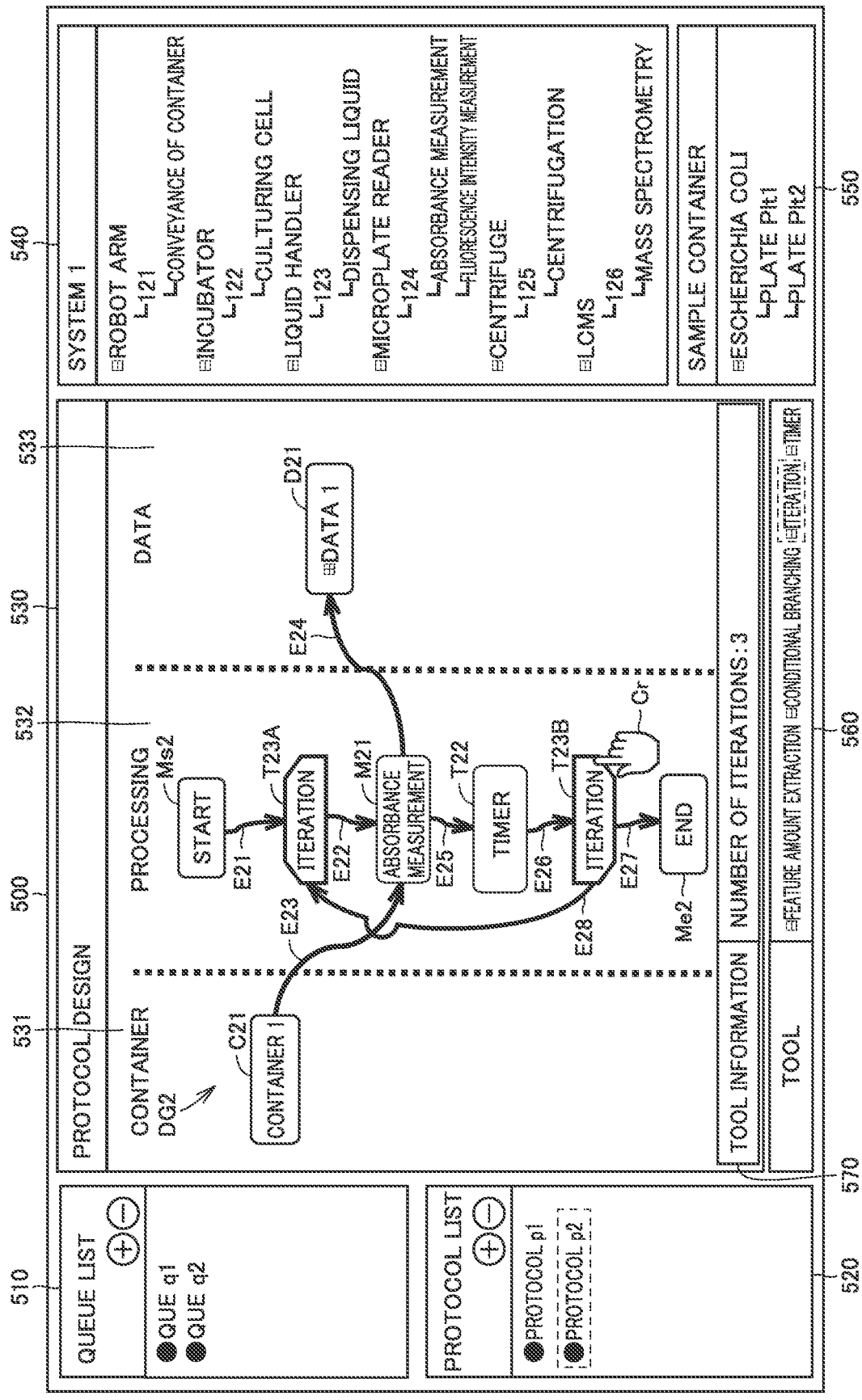
FIG. 12 is a view illustrating an oriented graph that is a design example of another experimental protocol.

FIG. 12 is a view illustrating an oriented graph DG2 that is a design example of another experimental protocol p2. As illustrated in FIG. 12, "protocol p2" is selected in protocol list window 520. Oriented graph DG2 includes a start node Ms2, an end node Me2, a processing node M21 corresponding to the absorbance measurement, a timer node T22, iteration nodes T23A, T23B, a container node C21, and a data node D21. Start node Ms2 and iteration node T23A are connected by an edge E21 from start node Ms2 to iteration node T23A. Iteration node T23A and processing node M21 are connected by an edge E22 from iteration node T23A to processing node M21. Container node C21 and processing node M21 are connected by an edge E23 from container node C21 to processing node M21. Processing node M21 and data node D21 are connected by an edge E24 from processing node M21 to data node D21.

Processing node M21 and timer node T22 are connected by an edge E25 from processing node M21 to timer node T22. Timer node T22 and iteration node T23B are connected by an edge E26 from timer node T22 to iteration node T23B. Iteration node T23B and end node Me2 are connected by an edge E27 from iteration node T23B to end node Me2. Iteration nodes T23B, T23A are connected by an edge E28 from iteration node T23B to iteration node T23A. Oriented graph DG2 includes a loop structure circulating in the order of a repetition node T23A, a processing node M21, a timer node T22, and an iteration node T23B. An upper limit value of the number of iterations of the iterative processing by iteration nodes T23A, T23B is designated in information window 570. The end condition of the iterative processing is a condition that the number of iterations is greater than or equal to the upper limit value. The continuation condition of the iterative processing is a condition that the number of iterations is smaller than the upper limit value. The iterative node can improve efficiency in the design of the iterative processing in the experimental protocol.

Figure 13:
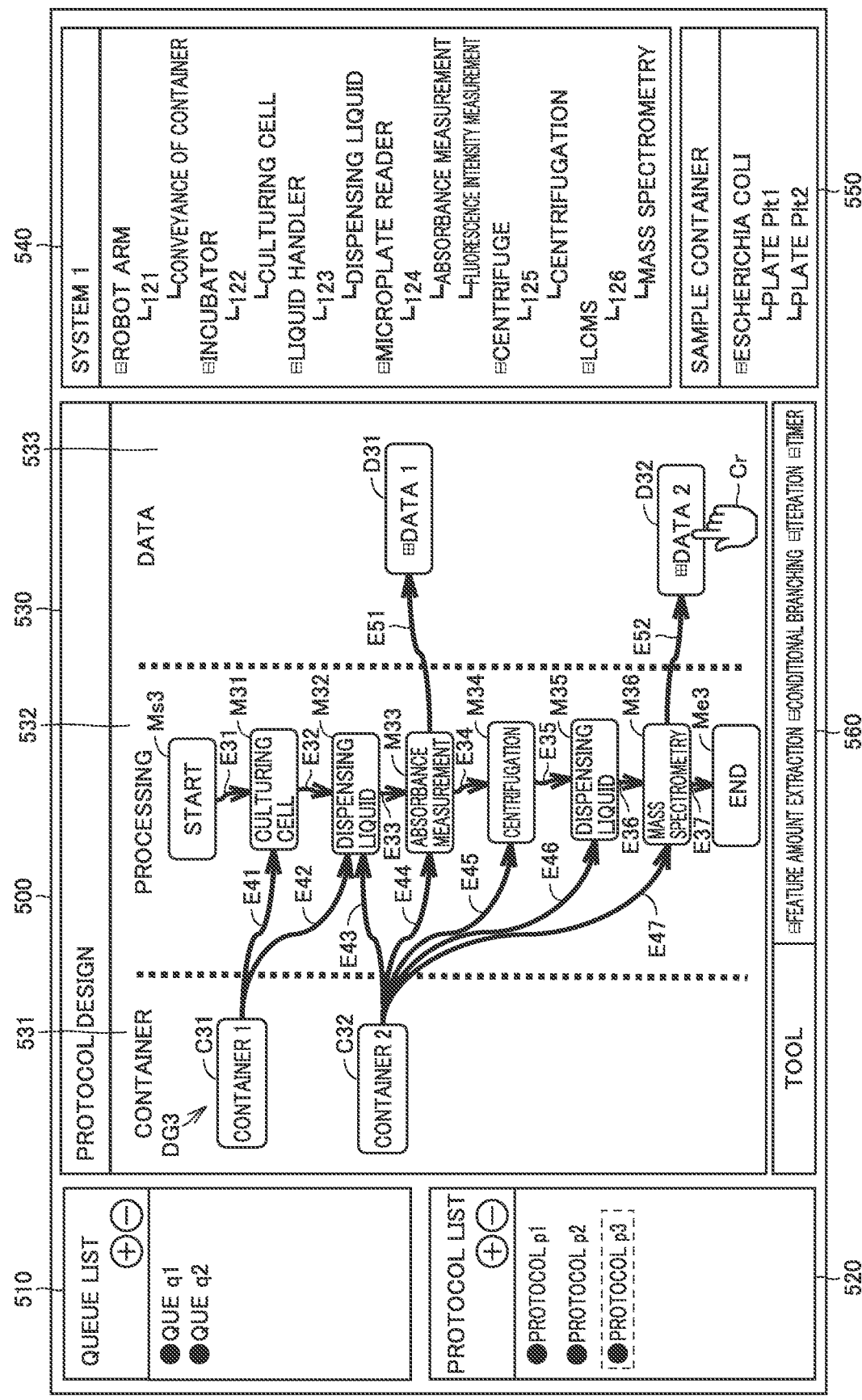
FIG. 13 is a view illustrating an oriented graph that is a design example of another experimental protocol.

FIG. 13 is a view illustrating an oriented graph DG3 that is a design example of another experimental protocol p3. As illustrated in FIG. 13, "protocol p3" is selected in protocol list window 520. Oriented graph DG3 includes a start node Ms3, an end node Me3, processing nodes M31, M32, M33, M34, M35, M36, container nodes C31, C32, and data nodes D31, D32. Processing nodes M31 to M36 correspond to "culturing cell", "dispensing liquid", "absorbance measurement", "centrifugation", "dispensing liquid", and "mass spectrometry", respectively, illustrated in automated experiment system window 540.

Start node Ms3 and processing node M31 are connected by an edge E31 from start node Ms3 to processing node M31. Processing nodes M31, M32 are connected by an edge E32 going from processing node M31 to processing node M32. Processing nodes M32, M33 are connected by an edge E33 going from processing node M32 to processing node M33. Processing nodes M33, M34 are connected by an edge E34 going from processing node M33 to processing node M34. Processing nodes M34, M35 are connected by an edge E35 going from processing node M34 to processing M35. Processing nodes M35, M36 are connected by an edge E36 going from processing node M35 to processing node M36. Processing node M36 and end node Me3 are connected by an edge E37 from processing node M36 to end node Me.

Container node C31 and processing node M31 are connected by an edge E41 from container node C31 to processing node M31. Container node C31 and processing node M32 are connected by an edge E42 from container node C31 to processing node M32.

Container node C32 and processing node M32 are connected by an edge E43 from container node C32 to processing node M32. Container node C32 and processing node M33 are connected by an edge E44 from container node C32 to processing node M33. Container node C32 and processing node M34 are connected by an edge E45 from container node C32 to processing node M34. Container node C32 and processing node M35 are connected by an edge E46 from container node C32 to processing node M35. Container node C32 and processing node M36 are connected by an edge E47 from container node C32 to processing node M36.

Processing node M33 and data node D31 are connected by an edge E51 from processing node M33 to data node D31. Processing node M36 and data node D32 are connected by an edge E52 from processing node M36 to data node D32.

Figure 14:
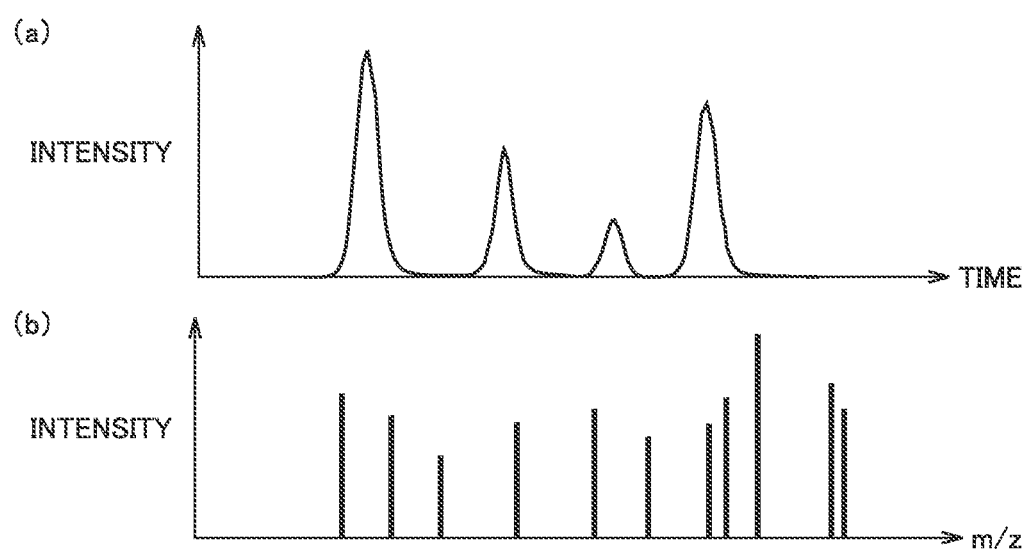
FIG. 14 is a view illustrating an example of information that is displayed when a predetermined GUI operation of a user is performed on a node included in the oriented graph in FIG. 13.

FIG. 14 is a view illustrating an example of information that is displayed when a predetermined GUI operation (for example, double click) of the user is performed on the node included in oriented graph DG3 in FIG. 13. The example of the information that is displayed when the data node D32 (selection node) in FIG. 13 is double-clicked is illustrated in FIG. 14. FIGS. 14(a) and 14(b) illustrate a liquid chromatogram and a mass spectrum produced from the output data of the mass spectrometry corresponding to processing node M36. For example, the description of the processing corresponding to the processing node is displayed when the processing node is double-clicked. For example, the detailed description of the sample included in the container is displayed when the container node is double-clicked. When the information about the node is displayed by a predetermined GUI operation on the node of the oriented graph, the information about the components of the experimental protocol designed in the form of the oriented graph can be efficiently referred to.

Figure 15:
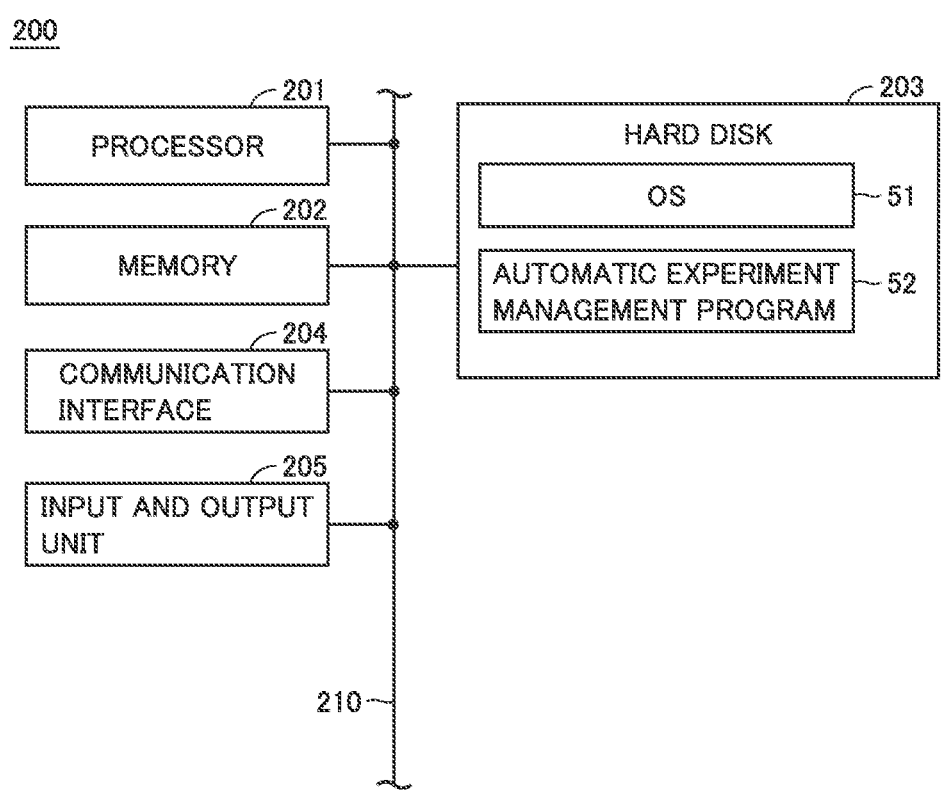
FIG. 15 is a block diagram illustrating a hardware configuration of a server device in FIG. 1.

FIG. 15 is a block diagram illustrating a hardware configuration of server device 200 in FIG. 1. As illustrated in FIG. 15, server device 200 includes a processor 201, a memory 202 and a hard disk 203 as a storage, a communication interface 204 as a communication unit, and an input and output unit 205. These are communicably connected to each other through a bus 210.

Hard disk 203 is a non-volatile storage device. For example, hard disk 203 stores a program 51 of an operating system (OS) and an automatic experiment management program 52. In addition to the data in FIG. 15, for example, settings and outputs of various applications are stored in hard disk 203. Memory 202 is typically a volatile storage device such as a dynamic random access memory (DRAM).

Processor 201 includes a central processing unit (CPU). Processor 201 reads a program stored in hard disk 203 into memory 202 and executes the program to implement various functions of server device 200. For example, processor 201 executing automatic experiment management program 52 provides experimental protocol design application 500 to terminal device 400. Processor 201 is connected to network NW through communication interface 204.

Figure 16:
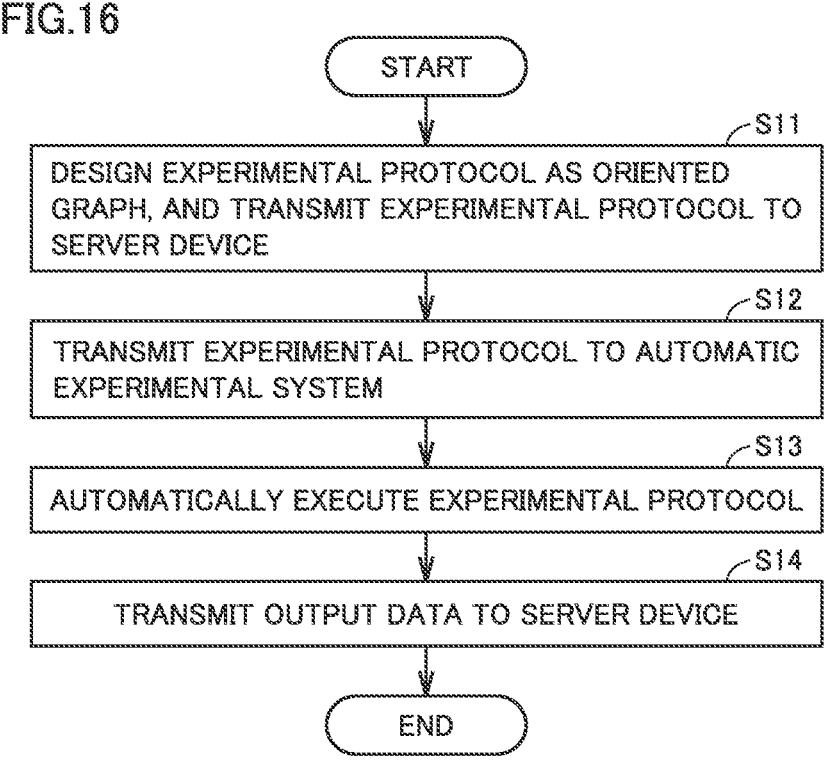
FIG. 16 is a flowchart illustrating a flow of an automatic experiment based on an experiment protocol performed in the automatic experiment management system of FIG. 1.

FIG. 16 is a flowchart illustrating a flow of an automatic experiment based on the experiment protocol performed in automatic experiment management system 1000 of FIG. 1. As illustrated in FIG. 16, in S11, terminal device 400 designs the experimental protocol in the form of the oriented graph, and transmits the experimental protocol to server device 200. In S12, server device 200 transmits the experimental protocol to the automatic experiment system selected by the user of terminal device 400. In S13, the controller of the automatic experiment system automatically executes the experiment protocol received from server device 200. In step S14, the controller transmits the output data of the processing included in the experimental protocol to server device 200.

In the embodiment, the case where the experimental protocol designed in the terminal device is transmitted to the automatic experiment system through the server device has been described. The experimental protocol may be directly transmitted from the terminal device to the automatic experiment system.

Figure 17:
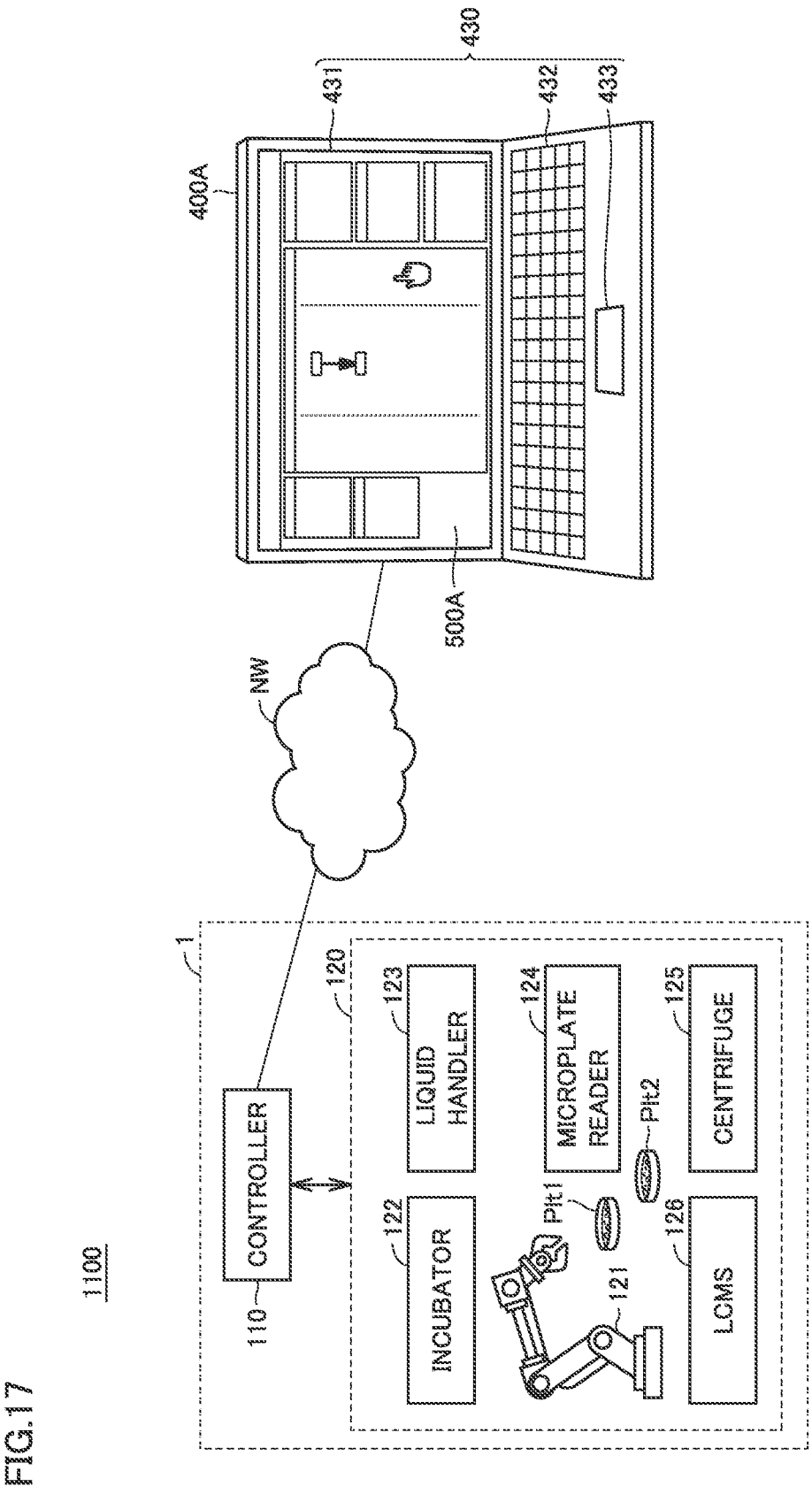
FIG. 17 is a block diagram illustrating a configuration of an automatic experiment management system according to a first modification of the embodiment.

FIG. 17 is a block diagram illustrating a configuration of an automatic experiment management system 1100 according to a first modification of the embodiment. The configuration of automatic experiment management system 1100 is a configuration in which server device 200 and database 300 are excluded from automatic experiment management system 1000 in FIG. 1 and terminal device 400 is replaced with a terminal device 400A. The other configurations are the same, and the description thereof will not be repeated. An experimental protocol design application 500A is displayed on display 431 of terminal device 400A.

Figure 18:
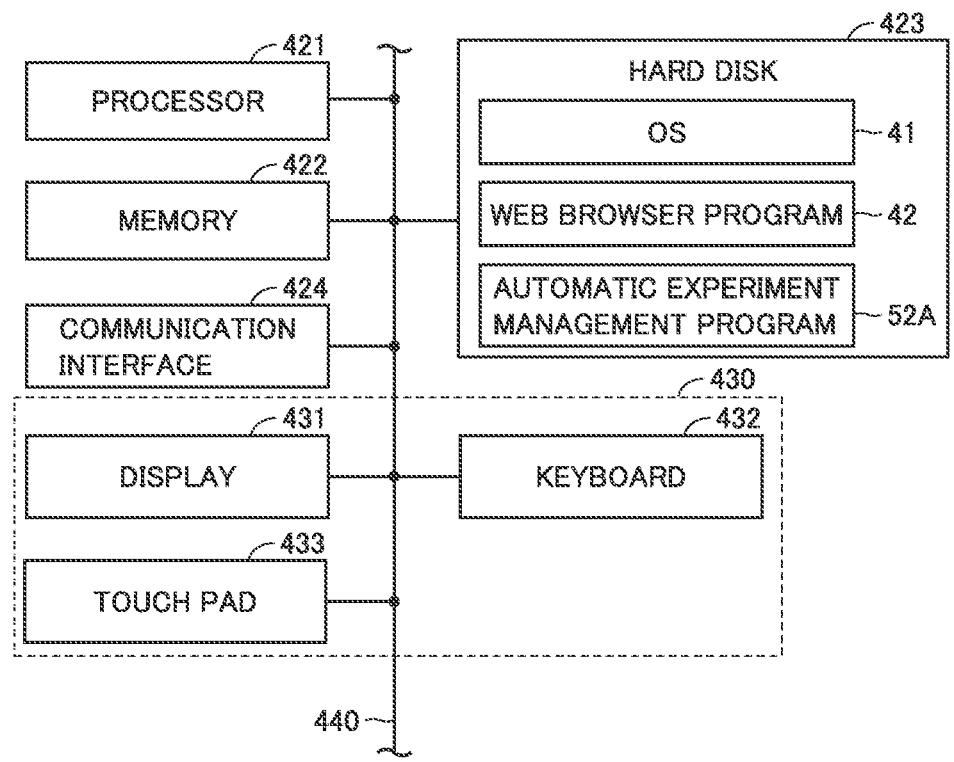
FIG. 18 is a block diagram illustrating a hardware configuration of a server device in FIG. 17.

FIG. 18 is a block diagram illustrating a hardware configuration of terminal device 400A in FIG. 17. The configuration of terminal device 400A is a configuration in which an automatic experiment management program 52A is added to hard disk 423 in FIG. 2. Because other configurations are the same, the description thereof will not be repeated. The automatic execution of the experimental protocol by experimental protocol design application 500A and the automatic experiment system is implemented when automatic experiment management program 52A is executed by processor 421.

Figure 19:
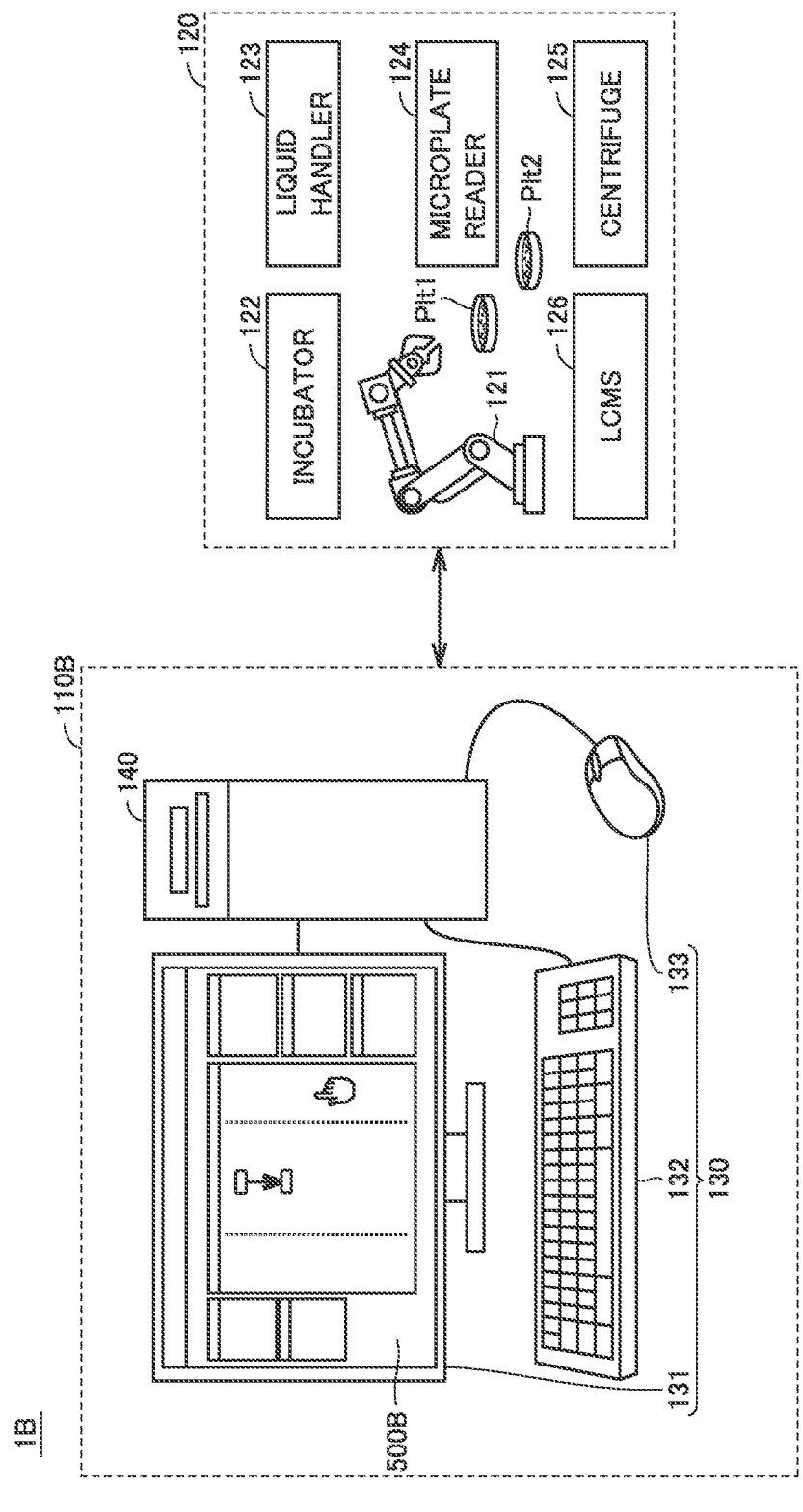
FIG. 19 is a block diagram illustrating a configuration of an information processing device according to a second modification of the embodiment.

The experimental protocol may be designed in the controller of the automated experiment system. FIG. 19 is a block diagram illustrating a configuration of an automatic experiment system 1B according to a second modification of the embodiment. The configuration of automatic experiment system 1B is a configuration in which controller 110 is replaced with a controller 110B in automatic experiment system 1 of FIG. 1. Because other configurations are the same, the description thereof will not be repeated.

As illustrated in FIG. 19, controller 110B includes an input and output unit 130 and a computer 140 (processing unit). Input and output unit 130 includes a display 131 (display unit), a keyboard 132 (input unit), and a mouse 133 (input unit). Display 131, mouse 133, and keyboard 132 are connected to computer 140. A GUI of experimental protocol design application 500B is displayed on display 131. Keyboard 132 and mouse 133 receive the GUI operation on experimental protocol design application 500B by the user. That is, the user performs the desired GUI operation on experimental protocol design application 500B by the operation of operating keyboard 132 or mouse 133 while the display of display 131 is referred to.

Figure 20:
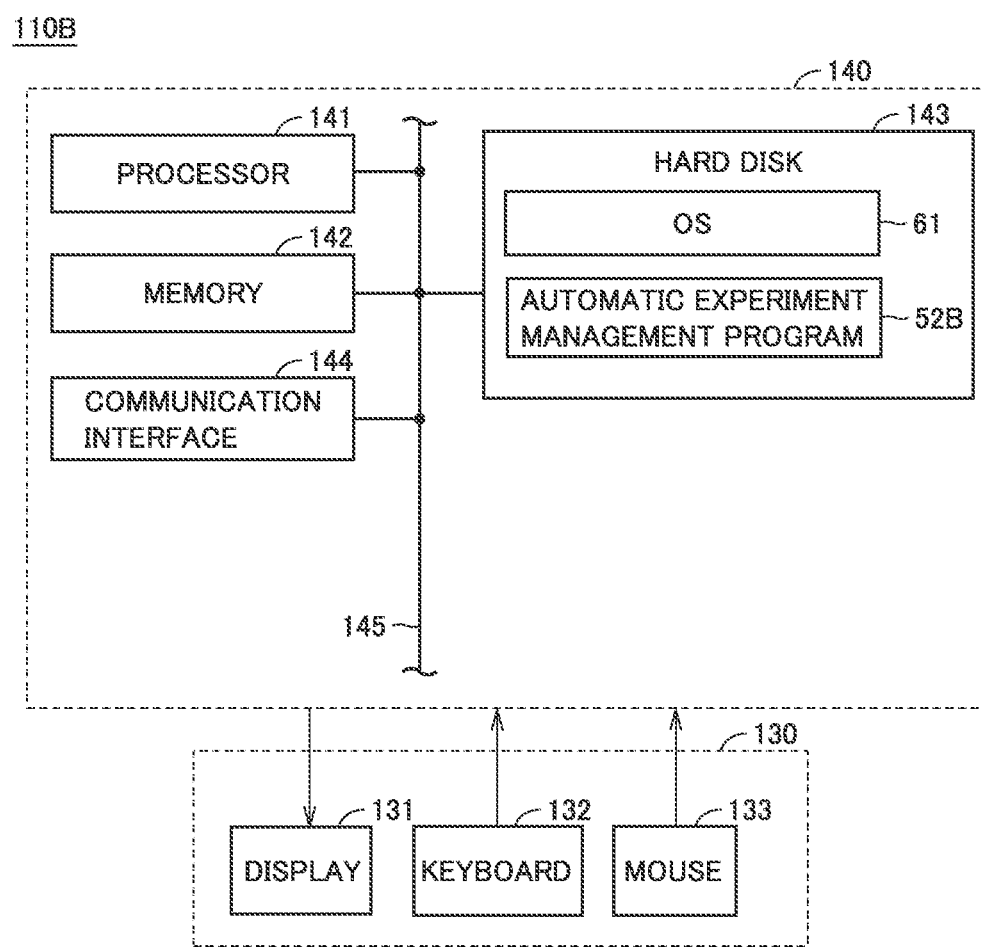
FIG. 20 is a block diagram illustrating a hardware configuration of a controller in FIG. 19.

FIG. 20 is a block diagram illustrating a hardware configuration of controller 110B in FIG. 19. As illustrated in FIG. 20, computer 140 includes a processor 141, a memory 142 and a hard disk 143 as a storage, and a communication interface 144. These are communicably connected to each other through a bus 145.

Hard disk 143 is a non-volatile storage device. For example, a program 61 of an operating system (OS) and an automatic experiment management program 52B are stored in hard disk 143. In addition to the data in FIG. 20, for example, settings and outputs of various applications are stored in hard disk 143. Memory 142 is typically a volatile storage device such as a dynamic random access memory (DRAM).

Processor 141 includes a central processing unit (CPU). Processor 141 reads a program stored in hard disk 143 into memory 142 and executes the program. The automatic execution of the experimental protocol by experimental protocol design application 500B and the plurality of experimental devices 120 is implemented when automatic experiment management program 52B is executed by processor 141. Processor 141 is connected to network NW through communication interface 144.

As described above, the method for designing the experimental protocol that can cope with more advanced processing can be provided according to the methods and systems of the embodiment and the first modification and the device of the second modification of the embodiment.

[Aspects]

It is understood by those skilled in the art that the embodiment described above are specific examples of the following aspects.

(Item 1)

A method according to an aspect of the present invention includes: receiving, from a user, a GUI operation to a specific application; designing an experimental protocol in a form of an oriented graph in accordance with the received GUI operation, the experimental protocol defining processing order of at least one experimental device; and controlling the at least one experimental device to automatically execute the experimental protocol. A plurality of nodes are selectable as a vertex of the oriented graph and the plurality of nodes include a processing node corresponding to processing by each of the at least one experimental device and a conditional branch node corresponding to conditional branch processing.

According to the method described in item 1, the experimental protocol can be designed in the form of the oriented graph including the conditional branch node, so that the method for designing the experimental protocol capable of coping with more advanced processing can be provided.

(Item 2)

The method described in item 1, wherein the plurality of nodes further include a container node, a data node, and a feature amount extraction node. The container node corresponds to a container containing a sample processed by the at least one experimental device. The data node corresponds to output data of processing on the sample by each of the at least one experimental device. The feature amount extraction node corresponds to processing for extracting a feature amount from the output data. A condition of the conditional branch node includes a condition related to the feature amount.

According to the method described in item 2, since the feature amount of the output data corresponding to the data node can be directly used for the condition of the conditional branch node through the feature amount extraction node, so that the design of the conditional branch processing based on the output data can be made efficient.

(Item 3)

In the method described in item 2, designing the experimental protocol in the form of the oriented graph includes automatically adding the container node and the data node due to the addition of the processing node. At this point, the container node and the processing node are connected by a first edge from the container node to the processing node. The processing node and the data node are connected by a second edge from the processing node to the data node.

According to the method described in item 3, the container node and the data node connected to the processing node are automatically added due to the addition of the processing node, whereby the design of the experimental protocol can be made efficient.

(Item 4)

In the method described in any one of items 1 to 3, information about a selection node is displayed in response to a predetermined GUI operation on the selection node included in the plurality of nodes.

According to the method described in item 4, when the information about the selection node is displayed by the predetermined GUI operation on the selection node, the information about a component of the experimental protocol designed in the form of the oriented graph can be efficiently referred to.

(Item 5)

In the method according to any one of items 1 to 4, the plurality of nodes further include an iterative node corresponding to iterative processing.

According to the method described in item 5, the iterative node can improve efficiency in the design of the iterative processing in the experimental protocol.

(Item 6)

A system according to another aspect includes at least one experimental device, a terminal device, and a controller. The terminal device includes an input unit and a processing unit. The input unit receives, from a user, a GUI operation to a specific application. The processing unit designs an experimental protocol in a form of an oriented graph in accordance with the received GUI operation. The experimental protocol defines processing order of the at least one experimental device. The controller controls the at least one experimental device to execute the experimental protocol. A plurality of nodes are selectable in the terminal device as a vertex of the oriented graph and the plurality of nodes include a processing node corresponding to processing by each of the at least one experimental device and a conditional branch node corresponding to conditional branch processing.

According to the system described in item 6, the experimental protocol can be designed in the form of the oriented graph including conditional branch nodes, so that the method for designing the experimental protocol capable of coping with more advanced processing can be provided.

(Item 7)

The system described in item 6 further includes a server device that provides the specific application to the terminal device. The server device transmits the experimental protocol designed in the terminal device to the controller.

According to the system described in item 7, the server device is interposed between the terminal device that designs the experimental protocol and the controller that controls and executes at least one experimental device of the experimental protocol, whereby the server device can collectively manage the plurality of terminal devices and the plurality of controllers.

(Item 8)

A device according to still another aspect controls at least one experimental device to execute an experimental protocol defining processing order of the at least one experimental device. The device includes a display unit, an input unit, and a processing unit. A specific application is displayed on the display unit. The input unit receives, from a user, a GUI operation to the specific application. The processing unit designs the experimental protocol in a form of an oriented graph in accordance with the GUI operation. A plurality of nodes are selectable as a vertex of the oriented graph and the plurality of nodes include a processing node corresponding to processing by each of the at least one experimental device and a conditional branch node corresponding to conditional branch processing.

According to the device described in item 8, the experimental protocol can be designed in the form of the oriented graph including the conditional branch node, so that the method for designing the experimental protocol capable of coping with more advanced processing can be provided.

For the above-described embodiment and modification, it is planned from the beginning of the application to appropriately combine the configurations described in the embodiments within a range in which no inconvenience or contradiction occurs including combinations not mentioned in the specification.

It should be considered that the disclosed embodiment is an example in all respects and not restrictive. The scope of the present invention is defined by not the description above, but the claims, and it is intended that all modifications within the meaning and scope of the claims and their equivalents are included in the present invention.

REFERENCE SIGNS LIST 1, 1B: automatic experiment system, 110, 110B: controller, 120: experimental device, 121: robot arm, 122: incubator, 123: liquid handler, 124: microplate reader, 125: centrifuge, 130, 205, 430: input and output unit, 131, 431: display, 132, 432: keyboard, 133: mouse, 140: computer, 141, 201, 421: processor, 142, 202, 422: memory, 143, 203, 423: hard disk, 144, 204, 424: communication interface, 145, 210, 440: bus, 200: server device, 300: database, 400, 400A: terminal device, 433: touch pad, 500, 500A, 500B: experimental protocol design application, 510: queue list window, 520: protocol list window, 530: protocol design window, 531: container region, 532: processing region, 533: data region, 540: automatic experiment system window, 550: sample container window, 560: tool window, 570: information window, 600: Web browser, 1000, 1100: automatic experiment management system, C1, C21, C31, C32: container node, Cr: selection cursor, D1, D21, D31, D32: data node, DG1 to DG3: oriented graph, T2: conditional branch node, M1, M21, M31 to M36: processing node, T1: feature amount extraction node, T23A, T23B: iterative node, Me, Me2, Me3: end node, Ms, Ms2, Ms3: start node, NW: network, Plt1, Plt2: plate, T22: timer node, p1 to p3: experimental protocol

The invention claimed is:

1. A method comprising:
receiving, from a user, a graphical user interface (GUI) operation interacting with a specific application;
designing an experimental protocol in a form of an oriented graph in accordance with the received GUI operation, the experimental protocol defining a processing order of at least one experimental device including a conveyance device and an analyzer, and the experimental protocol including processing on a physical sample including at least one substance; and
controlling the at least one experimental device to automatically execute the experimental protocol,
wherein a plurality of nodes are each selectable as a vertex of the oriented graph and the plurality of nodes include a processing node corresponding to processing by an experimental device of the at least one experimental device and a conditional branch node corresponding to conditional branch processing,
wherein controlling the at least one experimental device includes:
controlling the conveyance device to move the physical sample to an experimental device corresponding to each of a plurality of pieces of processing according to an order of the plurality of pieces of processing defined in the experimental protocol; and
controlling the analyzer to analyze components included in the physical sample quantitatively or qualitatively.

2. The method according to claim 1, wherein
the plurality of nodes further includes:
a container node corresponding to a container containing a physical sample to be processed by the at least one experimental device using the experimental protocol;
a data node corresponding to output data resulting from processing on the physical sample by the experimental device; and
a feature amount extraction node corresponding to processing for extracting a feature amount from the output data, and
a condition of the conditional branch node includes a condition related to the feature amount.

3. The method according to claim 2, wherein
designing the experimental protocol in the form of the oriented graph includes automatically adding the container node and the data node to the oriented graph when the processing node is added to the oriented graph,
the container node and the processing node are connected by a first edge from the container node to the processing node, and
the processing node and the data node are connected by a second edge from the processing node to the data node.

4. The method according to claim 1, wherein information about a selection node of the plurality of nodes is displayed in response to a predetermined GUI operation on the selection node.

5. The method according to claim 1, wherein the plurality of nodes further includes an iterative node corresponding to iterative processing.

6. The method according to claim 1,
wherein the plurality of nodes further includes a feature amount extraction node corresponding to processing for extracting a feature amount from the output data of processing on a physical sample by an experimental device of the at least one experimental device, and
wherein a condition of the conditional branch node includes a condition related to the feature amount.

7. The method according to claim 1, wherein designing the experimental protocol in the form of the oriented graph includes changing a connection relationship between the processing node and the conditional branch node according to the received GUI operation.

8. A system comprising:
at least one experimental device controlled using an experimental protocol and including a conveyance device and an analyzer, the experimental protocol including processing on a physical sample including at least one substance;

a terminal device that includes an input unit that receives, from a user, a GUI operation interacting with a specific application and a processor that designs an experimental protocol in a form of an oriented graph in accordance with the received GUI operation, the experimental protocol defining a processing order of the at least one experimental device; and a controller that controls the at least one experimental device to execute the experimental protocol, wherein a plurality of nodes are each selectable in the terminal device as a vertex of the oriented graph and the plurality of nodes include a processing node corresponding to a processing action performed by an experimental device of the at least one experimental device and a conditional branch node corresponding to conditional branch processing, wherein the controller controls:

the conveyance device to move the physical sample to an experimental device corresponding to each of a plurality of pieces of processing according to an order of the plurality of pieces of processing defined in the experimental protocol; and the analyzer to analyze components included in the physical sample quantitatively or qualitatively.

9. The system according to claim 8, further comprising a server device that provides the specific application to the terminal device, wherein the server device transmits the experimental protocol designed in the terminal device to the controller.

10. A method comprising:

receiving, by a user, a graphical user interface (GUI) operation interacting with a specific application;

designing an experimental protocol in a form of an oriented graph in accordance with the received GUI operation, the experimental protocol defining processing order of at least one experimental device including a conveyance device and an analyzer, and the experimental protocol including processing on a physical sample including at least one substance; and controlling the at least one experimental device to automatically execute the experimental protocol, wherein the at least one experimental device includes an analysis device, a plurality of nodes are each selectable as a vertex of the oriented graph and the plurality of nodes include a data node corresponding to output data of processing by the analysis device, and the method further comprises displaying, based on a selection, by the user, of the data node, at least one of a chromatogram and a spectrum produced from the output data corresponding to the data node, wherein controlling the at least one experimental device includes:

controlling the conveyance device to move the physical sample to an experimental device corresponding to each of a plurality of pieces of processing according to an order of the plurality of pieces of processing defined in the experimental protocol; and controlling the analyzer to analyze components included in the physical sample quantitatively or qualitatively.

* * * * *